Jan. 2, 1940. L. G. THOMAS 2,185,777
ELECTROSTATIC CONDENSER
Filed Dec. 27, 1938
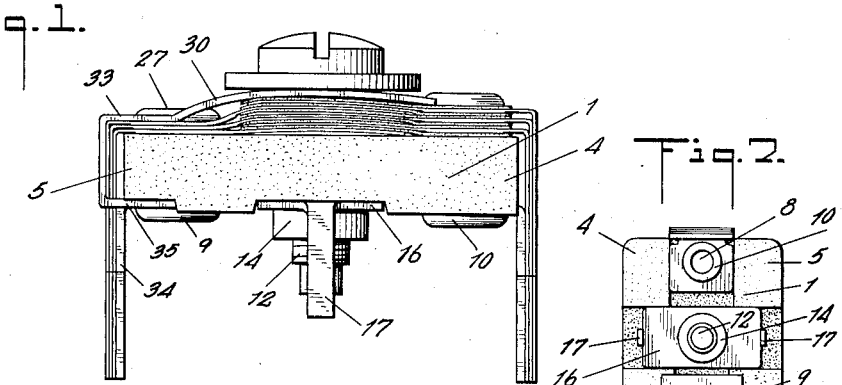
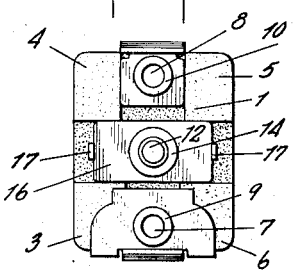
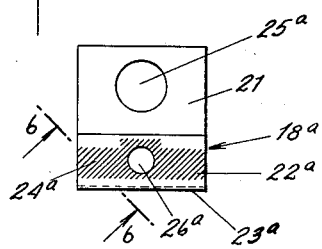
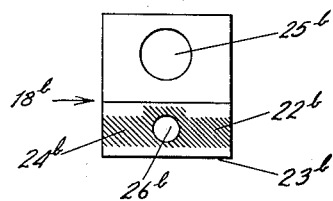
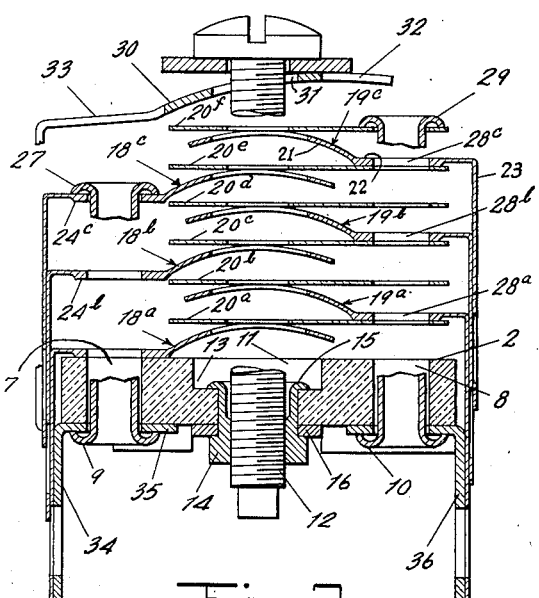
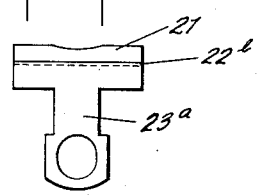
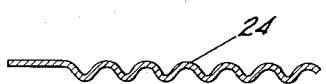
Leslie G. Thomas
INVENTOR
BY John J. Rogan
ATTORNEY Patented Jan. 2, 1940

2,185,777

UNITED STATES PATENT OFFICE 2,185,777

ELECTROSTATIC CONDENSER

Leslie G. Thomas, Tenafly, N. J., assignor to Automatic Winding Company, Inc., East Newark, N. J., a corporation of New Jersey Application December 27, 1938, Serial No. 247,750

9 Claims. (Cl. 175—41.5)

This invention relates to electrostatic condensers and more particularly to condensers which are known in the radio art as trimmer condensers.

A principal object of the invention is to provide an adjustable trimmer condenser which is simple and economical to assemble and which retains its adjustment indefinitely.

Another object is to provide an improved adjustable trimmer condenser of the bowed plate type.

A feature of the invention relates to a trimmer condenser of the bowed plate type having a special design of plate whereby rupture, scratching and excessive wear of the mica dielectric spacers are materially reduced.

Another feature relates to a trimmer condenser comprised of a pile-up of alternate metal plates and mica spacers, the plates having certain portions of their surfaces raised to increase their effective thickness whereby separate metal spacers between adjacent plate ends are avoided.

A further feature relates to a novel form of bowed plate for electrostatic trimmer condensers, having integral projections in the form of corrugations, embossings and the like for spacing the plates.

A still further feature relates to the novel organization, arrangement and relative location of parts which constitute an improved and efficient trimmer condenser.

Other features and advantages not specifically enumerated will be apparent after a consideration of the following detailed descriptions and the appended claims.

While the invention will be described herein as embodied in one preferred form, it will be understood that the invention in certain of its aspects is not necessarily limited thereto. Accordingly in the drawing, Fig. 1 is an end view, in elevation, of a preferred form of trimmer condenser embodying features of the invention.

Fig. 2 is a partially exploded view of the condenser of Fig. 1 to show the relation of the parts more clearly.

Fig. 3 is a detail plan view of one of the condenser plates or electrodes.

Fig. 4 is a detail plan view of another of the condenser plates or electrodes.

Fig. 5 is a front elevational view of Fig. 4.

Fig. 6 is a magnified sectional view of Fig. 4 taken along the line 6—6.

Fig. 7 is a bottom view of Fig. 1.

Referring more particularly to Figs. 1 and 2 there is shown a block or main support 1 of electrical insulation material, preferably, although not necessarily, of ceramic. The upper face of member 1 is flat, while the lower face is provided with integral corner projections 3, 4, 5, 6, defining intersecting channels. Block 1 has a pair of lateral perforations 7, 8, to receive the fastening eyelets 9, 10, and a central perforation 11 to receive the threaded adjusting shaft 12. For this latter purpose the upper face of block 1 is recessed as indicated by the numeral 13 to receive the internally threaded metal bushing 14, the upper end of which is spun over as indicated at 15 to fasten the bushing firmly in the block. If desired, a metal strip 16 having a pair of lugs 17 may be interposed between the lower end of bushing 14 and the under face of block 1.

The condenser proper comprises a pile-up of metal plates 18a, 19a, 18b, 19b, 18c, 19c, with interposed mica spacers or dielectrics 20a to 20f. As shown more clearly in Figs. 2 to 5, each metal plate is formed with a bowed portion 21 joined to a flat portion 22 which in turn is joined to a lug portion 23 extending downwardly at right angles. In accordance with the invention the flat portions 22 of each plate have their effective thickness increased in any suitable manner. Thus as shown in Figs. 3 and 6 this flat portion is corrugated as indicated by numeral 24 and preferably the corrugations extend at an angle to the edges of the plate as shown clearly in Fig. 3. Preferably also, the corrugations in superposed plates extend in opposite directions. Thus the corrugations 24a in plate 18a extend at approximately an angle of 45 degrees to the right hand edge of the plate, while the corrugations 24b in plate 18b extend at an angle of approximately 45 degrees to the left hand edge of plate 18b, and likewise for the remaining plates of the pile-up.

Each plate is provided with a central opening 25a, 25b, etc. through which the adjusting shaft 12 passes, it being understood that the openings 25a, 25b, etc. are materially larger than the width of the shaft 12 so as to avoid contact therewith thus preventing wear or distortion of the plates during the turning adjustment of the shaft. The plates 18a, 18b and 18c are also provided with openings 26a, 26b, etc. to receive the fastening eyelet 9 which has its upper end 27 spun over against the upper face of plate 18c. Likewise the plates 19a, 19b and 19c are provided with openings 28a, 28b etc. to receive the fastening eyelet 10 which has its upper end 29 spun over against the upper face of the uppermost mica 20f. It will be understood of course that the mica spacers are also provided with openings in alignment with openings 28a, 28b and 28c so that they are also fastened permanently in place at their right hand ends (Fig. 2) by the eyelet 10. It will also be understood that the superposed metal plates have their lug portions 23a, 23b, 23c disposed progressively at greater distance from the openings 28a, 28b, 28c so as to allow the plates to assume a nested assembly as shown in Figs. 1 and 2.

For the purpose of transmitting the adjusting movement of shaft 12 to the various plates, there is provided a metal member having a bowed portion 30 with a central opening 31 to accommodate the shaft 12, the right hand edge of portion 30 being slotted at 32 so as to clear the metal eyelet 10. The said member also has a slot 33 in its left hand section so as to clear the eyelet 9, and this slot may be formed by striking out a tongue or lug 34 which extends downwardly beneath block 1. The remainder of the member is bent around at right angles so as to embrace the portions of lugs 23a, 23b, 23c which lie against the edge of block 1, and the said member is also bent at right angles as indicated by numeral 35 so as to lie flat against the under face of block 1 where it is fastened by eyelet 9. A right-angled metal lug 36 is also fastened against the lower face of block 1 by eyelet 10 and is prevented from turning by having its horizontal portion snugly fitted within the slot formed by the projections 4 and 5. Preferably the mica spacers extend only under the bowed portions of the plates so that when the plates 18a, 18b and 18c are assembled and fastened in place by eyelet 9 the corrugations 24b in plate 18b engage the corrugations 24a in plate 18a thus providing a spacing between the flat portions 22a, 22b which is greater than the thickness of the stock from which the plates are formed, thus compensating for the fact that the mica spacers do not extend between the flat portions of superposed plates 18a, 18b, 18c, while they do extend between the flat portions of plates 19a, 19b, 19c. I have found that by providing these corrugations, the operation of the adjustment is more uniform and there is less wear on the mica spacers and also there is less chance of the micas being sheared or pierced by the plate edges, particularly when the member 12 is tightened very much. Furthermore the use of the corrugations as above described provides a more rigidly compact assembly and one which has less tendency to drift or change its electrostatic capacity.

While the invention is not limited to any specific material for the plates they may be made of spring brass or the like. Likewise instead of spacing the plates by means of corrugations, this spacing may be attained by embossing raised surface projections of any other character. However by employing corrugations it is possible to arrange the corrugations in superposed plates at an angle to each other so that the crests of the corrugations on one plate cannot fall or nest into the troughs of the corrugations in the other plate. It will be understood of course that while the drawing shows the corrugations in the form of parallel linear corrugations, they may take the form of circular, diamond, cross-shaped or irregular corrugations. Furthermore, while the invention has been shown as embodied in a condenser of the eyeleted or riveted type, it is capable of embodiment in other types of condensers where the metal plates are required to be spaced at certain parts of their surface. The corrugations in addition to acting as integral spacers between adjacent plates also serve to anchor the micas more securely between the plates because of the roughened surface provided by the corrugations.

Various changes and modifications may be made in the disclosed embodiment without departing from the spirit and scope of the invention.

What I claim is:

1. A trimmer condenser comprising an insulating support, a plurality of condenser plates fastened adjacent one margin of said support, another plurality of condenser plates fastened adjacent the opposite margin of said support, insulator spacer members interleaved between adjacent plates, and means integral with each plate in the region where it is fastened to said support to space it from adjacent plates.

2. A trimmer condenser comprising a block of insulation, a plurality of condenser plates riveted adjacent one margin of the block, another plurality of condenser plates riveted adjacent the opposite margin of the block, a plurality of mica spacers riveted adjacent to said other margin of the block the said condenser plates being interleaved and spaced by said mica spacers, each of said plates having a portion movable with respect to the block to vary the capacitance of the condenser, the first-mentioned plates having integral raised portions to increase the effective thickness thereof in the region of fastening.

3. A trimmer condenser comprising a plurality of superposed condenser plates each having a relatively flat fastening portion, said fastening portion being corrugated to space adjacent plates, and rivet means passing through said flat portions to fasten the plates together.

4. A trimmer condenser comprising a plurality of superposed condenser plates, each having a fastening portion and a movable portion for varying the capacitance of the condenser, each of said fastening portions having a series of integral raised surface projections to act as spacers between adjacent plates with the projections on the fastening portion of one plate intersecting the projections on the fastening portion of the other plate.

5. A trimmer condenser comprising a plurality of superposed condenser plates, each having a fastening portion and a movable portion for varying the capacitance of the condenser, each of said fastened portions having integral parallel corrugations, the corrugations in one plate extending at an angle to the corrugations in the adjacent plate.

6. A condenser plate for trimmer condensers and the like comprising a sheet of spring metal having a curved portion and a flat fastening portion, said fastening portion having its surface provided with a series of linear corrugations to increase the effective thickness thereof.

7. A trimmer condenser comprising a plurality of superposed condenser plates, each having a flexible portion and a common adjusting member passing through said flexible portions to vary the spacing therebetween, each of said plates having a fastening portion, said fastening portion having its surface corrugated for spacing adjacent plates, and rivet means passing through said fastening portions.

8. An electrostatic condenser comprising a pair of condenser plates, another condenser plate interleaved with said pair, dielectric spacer strips located between said other condenser plate and said pair of plates, each of said plates having an end portion extending beyond said spacer strips, a common support for all said plates, the said extending ends of said pair of plates being in contact and fastened to one end of said support, and the extending end of said other plate being fastened to the opposite end of said support, the contacting ends of said pair of plates having integral raised ribs with the ribs on one plate end intersecting the ribs on the other plate end.

9. An electrostatic condenser according to claim 8, in which said ribs are in the form of linear corrugations.

LESLIE G. THOMAS.